United States Patent
Orsley et al.

(10) Patent No.: US 9,019,211 B2
(45) Date of Patent: Apr. 28, 2015

(54) METHODS AND APPARATUS FOR PROVIDING TOUCH SENSITIVE DISPLAYS

(75) Inventors: Timothy J Orsley, San Jose, CA (US); Gary R Trott, San Mateo, CA (US)

(73) Assignee: Corning Incorporated, Corning, NY (US)

( * ) Notice: Subject to any disclaimer, the term of this patent is extended or adjusted under 35 U.S.C. 154(b) by 1218 days.

(21) Appl. No.: 12/914,402

(22) Filed: Oct. 28, 2010

(65) Prior Publication Data

US 2011/0102346 A1 May 5, 2011

Related U.S. Application Data

(60) Provisional application No. 61/256,616, filed on Oct. 30, 2009.

(51) Int. Cl.
*G06F 3/044* (2006.01)

(52) U.S. Cl.
CPC ........... *G06F 3/044* (2013.01); *Y10T 156/1052* (2015.01); *Y10T 156/10* (2015.01); *Y10T 156/1075* (2015.01)

(58) Field of Classification Search
CPC .............. G06F 3/0412; G06F 3/044; G06F 2203/04103; G06F 2203/04111
USPC ............... 178/18.01–19.07; 345/173–178
See application file for complete search history.

(56) References Cited

U.S. PATENT DOCUMENTS

| | | | |
|---|---|---|---|
| 6,057,903 A | 5/2000 | Colgan et al. | |
| 6,177,918 B1 | 1/2001 | Colgan et al. | |
| 7,666,511 B2 | 2/2010 | Ellison et al. | |
| 2003/0234770 A1 | 12/2003 | MacKey | |
| 2006/0132332 A1* | 6/2006 | Ono | 341/33 |
| 2008/0062148 A1* | 3/2008 | Hotelling et al. | 345/174 |
| 2008/0165158 A1 | 7/2008 | Hotelling et al. | |
| 2009/0160817 A1 | 6/2009 | Wu et al. | |
| 2009/0194344 A1 | 8/2009 | Harley et al. | |
| 2009/0215607 A1 | 8/2009 | Dejneka et al. | |
| 2010/0035038 A1 | 2/2010 | Barefoot et al. | |
| 2010/0047521 A1 | 2/2010 | Amin et al. | |

FOREIGN PATENT DOCUMENTS

WO 2007146780 A2 12/2007

OTHER PUBLICATIONS

Waferbond section of Brewer Science's website: http://www.brewerscience.com/products/waferbond.
Barefoot et al; U.S. Appl. No. 12/858,490, filed Aug. 18, 2010, titled "Crack and Scratch Resistant Glass and Enclosures Made Therefrom".

* cited by examiner

*Primary Examiner* — Michael Pervan
(74) *Attorney, Agent, or Firm* — Timothy M Schaeberle

(57) ABSTRACT

Methods and apparatus provide for a touch sensitive display, which may include: a display layer; a cover glass layer formed from ion exchanged glass; and an optional touch glass layer, where, either on a first side of the touch glass or on a first side of the cover glass, a grid of electrode traces is disposed, which is sensitive to distortions of a local electrostatic field caused by a touching event, and the grid may be positioned between the display layer and the cover glass layer.

4 Claims, 19 Drawing Sheets

FIG. 2
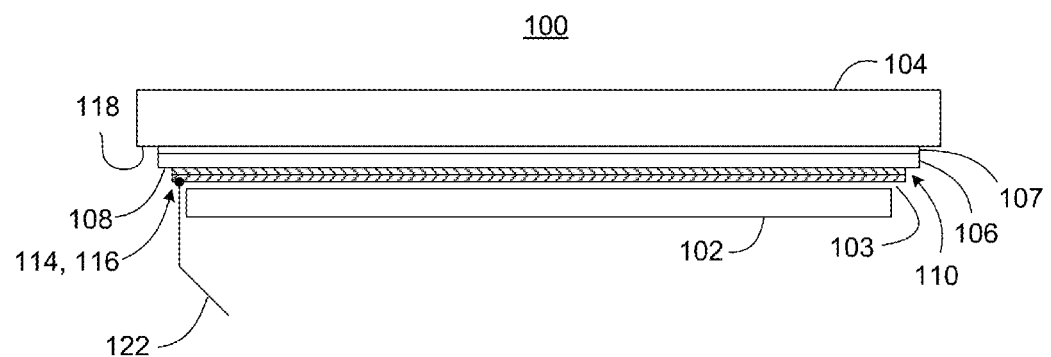
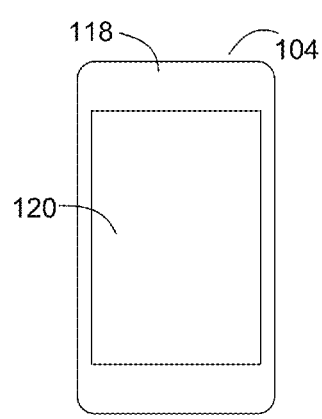
FIG. 3A
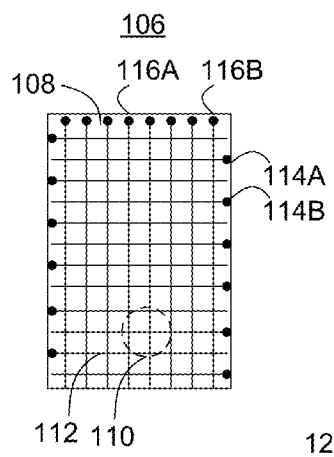
FIG. 3B
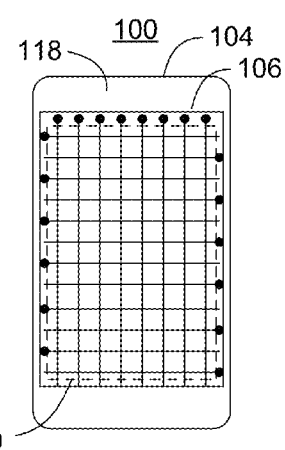
FIG. 3C

200

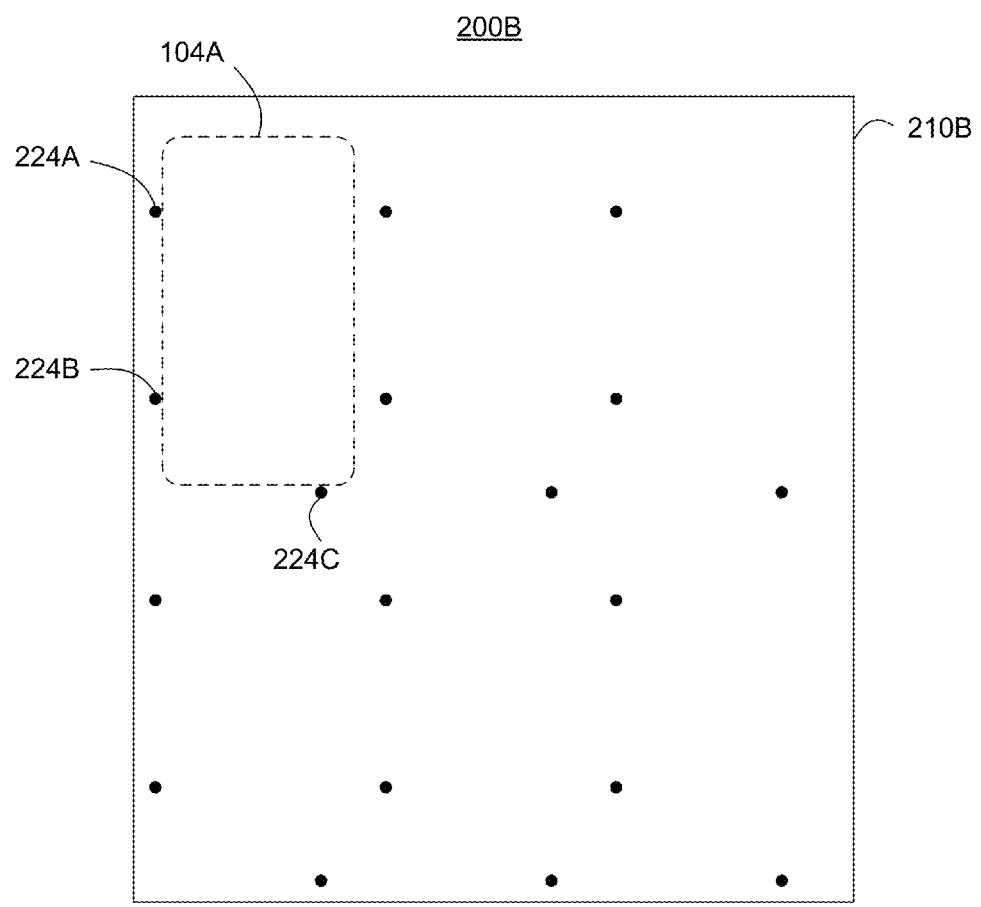

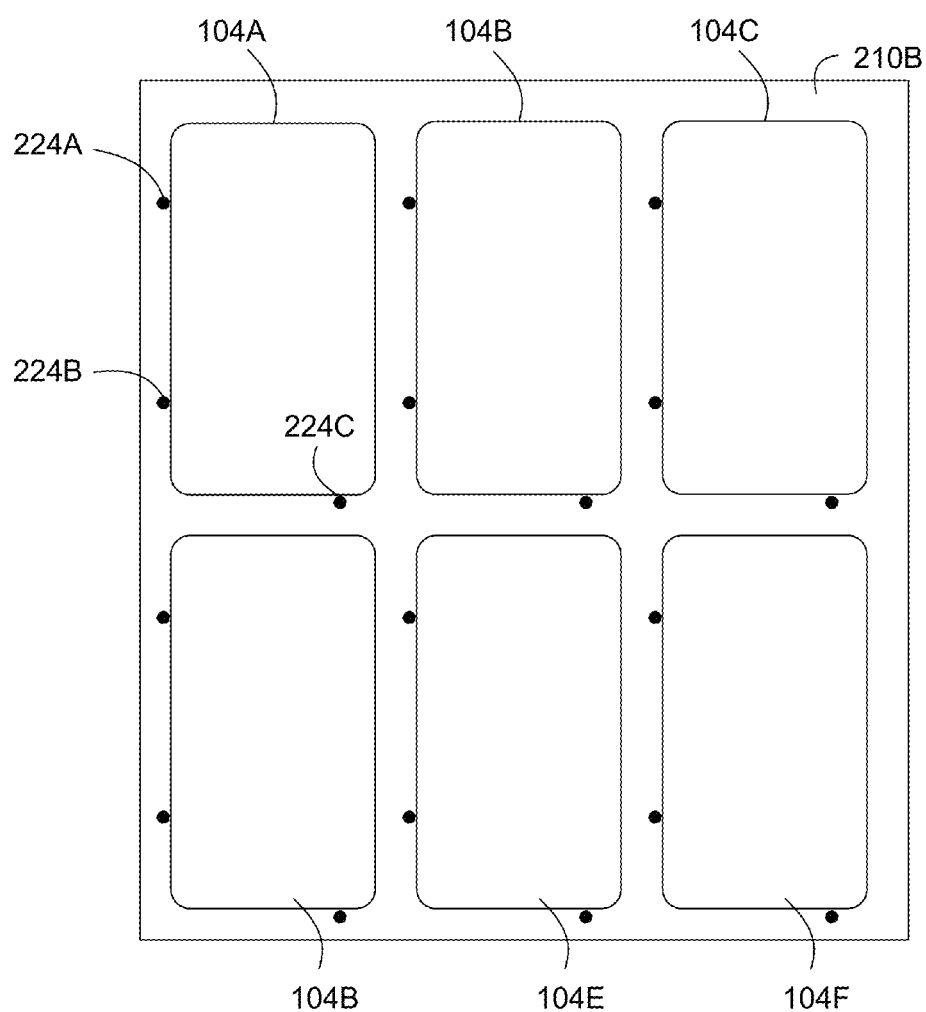

FIG. 13
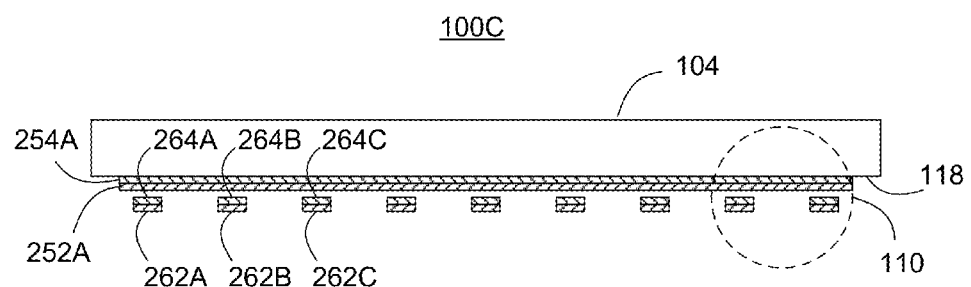
FIG. 14A   FIG. 14B   FIG. 14C
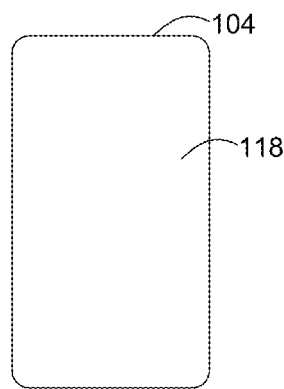
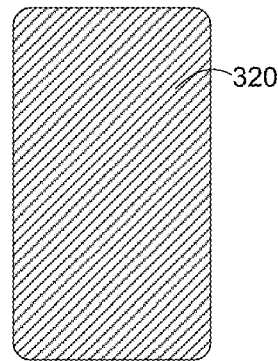
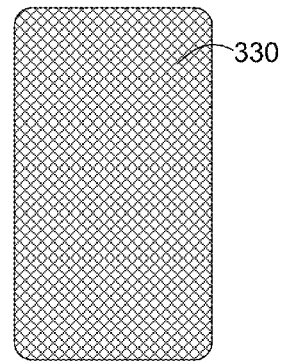

METHODS AND APPARATUS FOR PROVIDING TOUCH SENSITIVE DISPLAYS

CROSS REFERENCE TO RELATED APPLICATIONS

This application claims the benefit of U.S. Provisional Patent Application No. 61/256,616, filed Oct. 30, 2009, the entire disclosure of which is hereby incorporated by reference.

BACKGROUND OF THE INVENTION

The present invention relates to methods and apparatus for providing touch sensitive displays, such as liquid crystal displays, organic light emitting diode displays, etc.

The display market is eager for displays that offer touch sensing capability—and the market size for displays with touch functionality is expected to grow tremendously in the coming years. As a result, many companies have researched a variety of sensing techniques, including resistive, projected capacitive, infrared, etc. While many of these techniques result in reasonable touch capability, each technique carries some performance disadvantage for specific applications, and nearly all result in significant added cost to the manufacture of each display.

In terms of performance, the basic metrics for touch sensitive displays are the accurate sensing of a touch event and the determination of the precise location of the touch event on the touch/display window. Many secondary attributes are becoming important for added functionality, including flexibility in sensing various touching implements beyond the human finger, such as a pen, stylus, etc., the ability to sense multiple, simultaneous touch events, location resolution, and the ability to distinguish false touches (hovering, or environmental disturbances).

As touch sensitive displays are gaining wider use in mobile device applications, the overall thickness and weight of the touch sensitive display are becoming more important metrics for commercial viability. When such additional criteria are taken into consideration, very few sensor technologies stand out.

Accordingly, there are needs in the art for new methods and apparatus for providing thinner and lighter touch sensitive displays, with low cost, tight manufacturing tolerances, and ease of manufacture being related goals.

SUMMARY OF THE INVENTION

With reference to FIGS. 1A and 1B, a touch sensitive display 10 may include a display layer 12 (such as an LCD), a touch glass layer 14, and a cover glass layer 16. The touch glass layer 14 carries electrical traces 18, 20 on opposing sides thereof. The electrical traces 18, 20 form a grid with an insulator (the glass) therebetween. As the human body is a conductor, touching the surface of the display 10 (even through the cover glass 16) results in a distortion of the local electrostatic field, measurable as a change in capacitance. The technology used to determine the location of the touch is capacitive sensing. The electrical traces 18, 20 may be formed from Indium tin oxide (ITO, or tin-doped indium oxide). Indium tin oxide is often used in this application because of its electrical conductivity and optical transparency. A compromise has to be reached during film deposition on the touch glass 14, however, as increasing the concentration of charge carriers in the material will increase the conductivity, but decrease its transparency. Thin films of indium tin oxide are most commonly deposited on the touch glass by electron beam evaporation, physical vapor deposition, or any number of sputter deposition techniques.

It has been discovered that commercial advantages may be obtained when the construction of the touch sensitive display 10 is thinner and lighter. This may be achieved when the touch glass 14 is eliminated and the functionality thereof is integrated into the cover glass 16, e.g., by placing the electrical traces 18, 20 on an inside surface of the cover glass 16. If the cover glass 16 were not hardened, a manufacturing approach would be to start with a single, large glass panel (large enough for many touch sensitive displays), pattern the panel with electrical traces 18, 20 using photolithography, and then singulating (cutting) the larger panel into smaller, individually-sized touch sensitive displays.

In order to prevent undesirable characteristics in the field, the cover glass 16 should be hardened, which may complicate the manufacturing process. In some applications, such as when using chemically strengthened glass (e.g., ion exchanged, alkali aluminosilicate glass), there are few practical manufacturing processes available for cutting such glass after it has been hardened. Thus, when using such cover glass 16, the glass should be cut prior to the hardening process. Since the hardening process is quite corrosive and would remove or damage any electrical traces 18, 20, such traces must be applied after cutting and hardening. Consequently, the aforementioned approach of patterning a large glass panel with electrical traces 18, 20, followed by singulating cannot be used when chemically strengthened glass is employed as the cover glass 16. Instead, the patterning of the electrical traces 18, 20 must be done on pre-cut, hardened cover glass panels. This approach has a significant cost impact as small, singulated panels do not lend themselves to large scale, and cost-effective, photolithography.

In accordance with one or more embodiments described herein, methods and apparatus provide for a touch sensitive display, which may include: a display layer; a cover glass layer formed from ion exchanged glass; and an optional touch glass layer. Either on a first side of the touch glass or on a first side of the cover glass, a grid of electrode traces is disposed, which is sensitive to distortions of a local electrostatic field caused by a touching event. The grid may be positioned between the display layer and the cover glass layer.

In one or more embodiments, the electrode traces may be formed from a transparent and conductive material, such as Indium tin oxide. In one or more further embodiments, the electrode traces may be formed from an opaque, metal material and a layer of substantially dark material may be interposed between one or more of such electrode traces and the cover glass layer.

Other aspects, features, and advantages of the embodiments herein will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the embodiments described herein are not limited to the precise arrangements and instrumentalities shown.

FIG. 2 is a side view of a touch sensitive display in accordance with one or more embodiments herein;

FIGS. 3A and 3B are views of some components of the touch sensitive display of FIG. 2;

FIG. 3C is a plan view of the touch sensitive display of FIG. 2 produced using the components of FIGS. 3A and 3B in accordance with one or more embodiments herein;

FIG. 11A is a plan view of a carrier, including fixed registration pins, also useful in manufacturing a plurality of touch sensitive displays in a batch process in accordance with one or more further embodiments herein;

FIG. 11B is a plan view of the carrier and the plurality of pieces of cover glass in a further stage of manufacture;

FIG. 13 is a side view of a touch sensitive display having a still further alternative configuration; and FIGS. 14A-14H are illustrations of a patterning process whereby electrode traces are disposed and formed on a piece of cover glass to produce the touch sensitive display of FIG. 13 in accordance with one or more embodiments herein.

DETAILED DESCRIPTION OF THE PREFERRED EMBODIMENTS

Figure 1A:
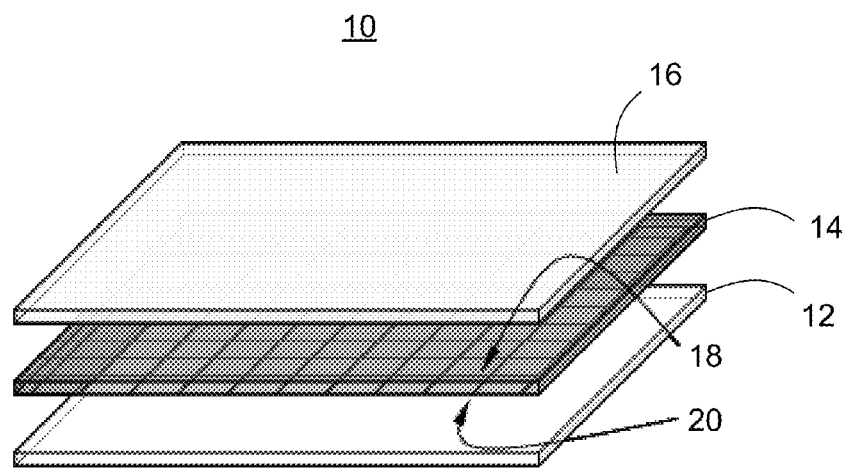
FIGS. 1A and 1B are perspective and side views, respectively, of a touch sensitive display having certain characteristics that may be employed in one or more embodiments herein.
Figure 1B:
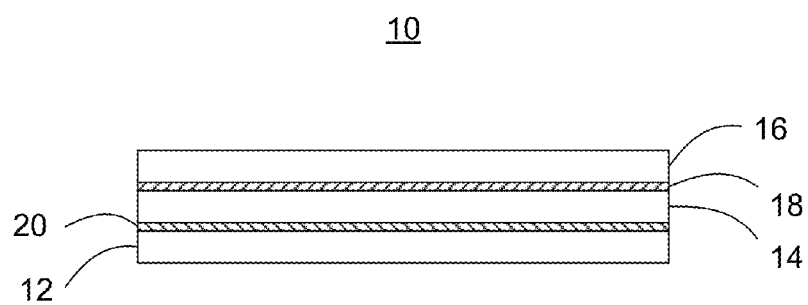

With reference to the drawings wherein like numerals indicate like elements there is shown in FIG. 2 a touch sensitive display 100 in accordance with one or more embodiments and aspects described herein. The touch sensitive display 100 may be used in a variety of consumer electronic articles, for example, cell-phones and other electronic devices capable of wireless communication, music players, notebook computers, mobile devices, game controllers, computer "mice", electronic book readers and other devices.

The touch sensitive display 100 includes a display layer 102, a cover glass layer 104, and a touch glass layer 106 positioned between the display layer 102 and the cover glass layer 104. The touch sensitive display 100 may include an air gap 103 between the display layer 102 and the touch glass 106 and grid 110 combination. The touch glass 106 and grid 110 combination may be laminated to the cover glass layer 104 via an adhesive layer 107.

The touch glass layer 106 includes a first side 108, on which a grid 110 of electrode traces are disposed. The grid 110 is sensitive to distortions of a local electrostatic field caused by touching events. Suitable electronic circuitry (not shown) is connected to, and receives signals from, the grid 110 in order to detect the touching events, including the specific locations of the events on the cover glass 104. Such circuitry is well known in the art and will not be described in more detail herein. Such circuitry is coupled to the grid 110 by way of a number of electrode pads 114 and 116 coupled to the respective terminal ends of one of more of the electrode traces.

The cover glass 104 is preferably formed from a chemically strengthened glass, such as an alkali aluminosilicate glass hardened through ion exchange. These types of glasses are frequently complicated compositions consisting, not only of $Na_2O$ (soda), CaO (lime) and $SiO_2$ (silica), but also of several other oxides such as MgO, $Li_2O$, $K_2O$, ZnO, and $ZrO_2$. Once hardened through ion exchange, these types of glass exhibit certain characteristics that make them desirable for cover glass (protective) applications. One of the characteristics is that they have a central tension below a threshold value, and exposed surfaces that are under compression. Balancing the compressive stresses at the surfaces or outer region of the glass with the tensile stress within the glass may alter the frangibility of the glass (e.g., the tendency of the glass to shatter into many small pieces upon a failure, which has to do with the energy within the glass caused by the compression/tension profiles). The hardening of the cover glass 104 (e.g., through the ion exchange process) is a complicating factor because it is difficult, if not impossible, to cut the glass in its hardened state, mostly due to the frangibility of the glass. Dealing with this issue will be discussed in further detail later in this description.

Further details as to the formulation and/or production details of a glass suitable for use as the cover glass 104 may be found in one or more of: U.S. Pat. No. 7,666,511 Issued Feb. 23, 2010; U.S. Patent Publication No. 2010/0035038 published Feb. 11, 2010; U.S. Patent Publication No. 2010/0047521 published Feb. 25, 2010; U.S. patent application Ser. No. 12/858,490 filed Aug. 18, 2010; and U.S. Patent Publication No. 2009/0215607 published Aug. 27, 2009, the entire disclosures of which are hereby incorporated by reference.

As illustrated in FIG. 2, and in accordance with one or more embodiments herein, the first side 108 of the touch glass 106, carrying the electrode traces of the grid 110 faces the display layer 102, and an opposite, second side of the touch glass 106 is laminated to one side 118 of the cover glass 104 via the adhesive layer 107. Such lamination may be achieved using any of the known technologies, such as any of the known optically clear adhesives.

The assembly process for this embodiment is generally illustrated in FIGS. 3A, 3B, and 3C. FIG. 3A is a view of the one side 118 of the cover glass 104 prior to lamination of the touch glass 106 thereto. The one side 118 of the cover glass 104 may include some opaque pigmented material (such as black matrix) to define a transparent area (or window) 120 and a border that is not transparent. The window 120 may be sized and shaped to register with the layout of the grid 110 and the viewable area of the display layer 102. FIG. 3B is a view of the touch glass 106 after the first side 108 thereof has been patterned with electrode traces 112 of the grid 110, including electrode pads 114A, 114B, etc. and 116A, 116B, etc. The peripheral shape and dimensions of the touch glass 106 are slightly larger than the window 120 in order to hide the electrode pads 114, 116, and any other structures that are not to be visible to the user.

FIG. 3C illustrates the combination of the touch glass 106 laminated to the cover glass 104 (the display layer 102 not being shown). Once the display layer 102 is in place, the touch glass layer 106 is positioned between the display layer 102 and the cover glass layer 104. FIG. 3C also shows that the grid 110 is in registration with the window 120, such that the touch events by a user of the touch sensitive display 100 would be sensed through the window 120. The electrode pads 114, 116 are positioned about the periphery of the touch glass 106 in such a way that they are outside the window 120. Additionally, since the electrode traces 112 are directed toward the display layer 120, the electrode pads 114, 116 are accessible (so long as the display layer 120 does not cover them) for connection via one or more leads, such as a flex cable or the like.

Advantageously, since the thickness of the touch glass 106 may be on the order of about 100 um or so, as compared with the thickness of conventional touch glass layers (which is on the order of 0.5 to 1 mm), the overall thickness of the touch sensitive display 100 is reduced using the configuration of FIG. 2.

Figure 4A:
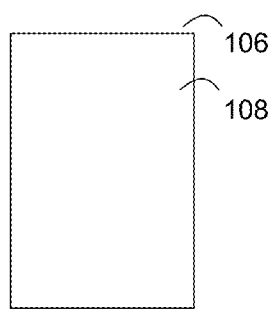
FIGS. 4A-4G are illustrations of a patterning process whereby electrode traces are disposed and formed on a piece of touch glass in accordance with one or more embodiments herein.
Figure 4B:
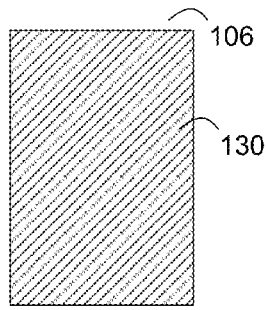
Figure 4C:
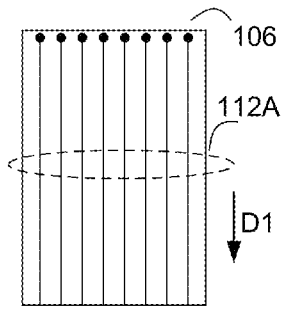
Figure 4D:
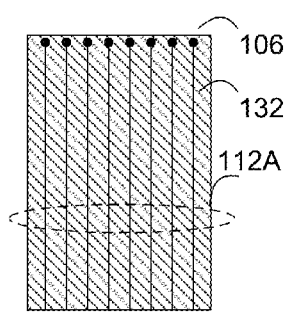
Figure 4E:
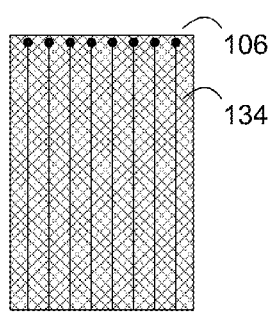
Figure 4F:
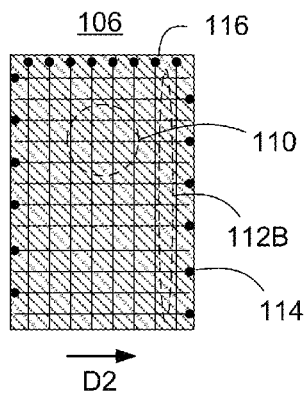

The touch glass 106 may be patterned using any of the known technologies and techniques. Among these approaches is the process illustrated in FIGS. 4A-4G. FIG. 4A illustrates a pre-cut piece of touch glass 106 with the first side 108 thereof facing out of the page. FIG. 4B shows the touch glass 106 after the first side 108 thereof has been coated with electrode material 130. The specific electrode material 130 may be formed from any of the known materials, such as Indium tin oxide, and any of the known coating processes may be employed. FIG. 4C shows the touch glass 106 after removing some of the electrode material 130 and leaving a first plurality of traces 112A extending substantially in a first direction, D1. Any of the known processes for removing the electrode material 130 may be employed, such as photolithography. Next, as illustrated in FIG. 4D a dielectric layer 132 is applied to the first side 108 of the touch glass layer 106, which substantially covers the first plurality of traces 112A. The specific formation of the dielectric layer 132 may be formed from any of the known materials, such as silicon dioxide, and any of the known coating processes may be employed. FIG. 4E shows the touch glass 106 after the first side 108 thereof has been coated with further electrode material 134, substantially covering the dielectric layer 132. Next, as illustrated in FIG. 4F some of the electrode material 134 is removed (e.g., via photolithography) to leave a second plurality of traces 112B extending substantially in a second direction, D2, which is transverse to the first direction D1. The first plurality of traces 112A and the second plurality of traces 112B form the grid 110 that is sensitive to distortions of the local electrostatic field.

Figure 4G:
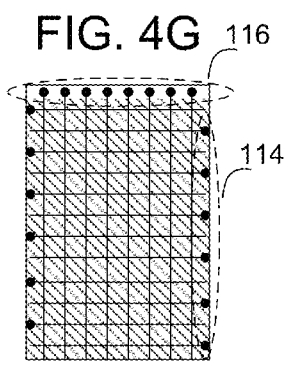

The electrode pads 114 at the terminal ends of the second plurality of traces 112B are exposed and accessible for connection to respective leads or a cable. Given the configuration of FIG. 4F, however, the electrode pads 116 at the terminal ends of the first plurality of traces 112A are covered by at least the dielectric layer 132. Thus, the electrode pads 116 are not exposed and are not accessible for connection to leads as illustrated in FIG. 4G, the electrode pads 116 may be exposed and made accessible for connection by laser ablation. Alternatively, the electrode pads 116 may be masked off during the process of applying the dielectric layer 132, such that they remain available for later connection. Again, the peripheral shape and dimensions of the touch glass 106 are slightly larger than the window 120 in order to hide the electrode pads 114, 116 from the view of the user.

It is noted that although the grid 110 has been described and illustrated as being in a substantially regular pattern, and the traces 112 and electrodes 114, 116 have been illustrated in very regular patterns, those skilled in the art will recognize that such configurations are shown for discussion purposes only, and not by way of limitation. Indeed, any orientation of the traces 112 and the electrodes 114, 116 are permissible so long as the objective (a grid 110 that is sensitive to distortions of the local electrostatic field) is achieved.

In embodiments in which a pre-cut piece of touch glass 106 is employed (such as illustrated in FIGS. 4A-4G), the touch glass may be formed from any suitable glass composition. Even the aforementioned chemically strengthened alkali aluminosilicate glass may be employed.

Care must be taken in handling the touch glass layer 106 during patterning or other process step because such layer is very thin. Indeed, very thin glass on the order of 100 um or so can easily bend or warp during the patterning process. Accordingly, in accordance with one or more embodiments herein, the touch glass layer 106 is subject to special handling prior to the patterning described in FIGS. 4A-4G.

Figure 5A:
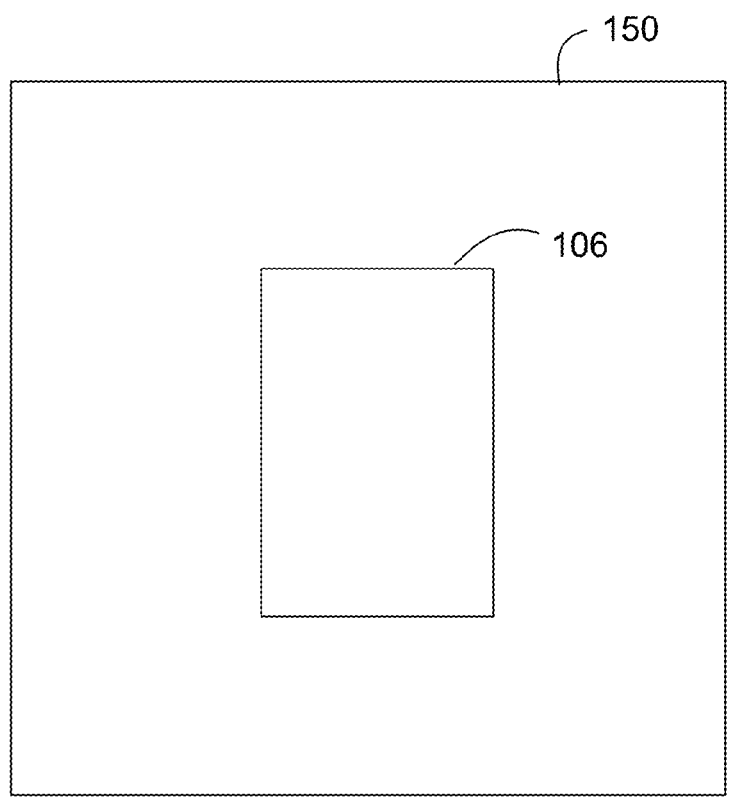
FIG. 5A is a schematic diagram of a carrier system that is useful in patterning one or more touch glass layers.

With reference to FIG. 5A, a carrier 150 may be employed to hold the relatively thin touch glass layer 106 during patterning. The carrier 150 may be formed from any suitable material, although the material should be stiff (to provide the requisite support for the touch glass layer 106). The material of the carrier 150 should also be suitable for establishing a temporary bond with the touch glass 106. It is believed that advantages may be achieved when the material of the carrier 150 is somewhat matched with the material of the touch glass layer 106 (e.g., of similar thermal expansion coefficients, and similar chemical composition). Thus, for example, the carrier 150 may be formed from a suitable glass material, such as a piece of an alkali aluminosilicate glass, which has been hardened through ion exchange. Although the relative size of the carrier 150 illustrated in FIG. 5A is shown for illustration and discussion, those skilled in the art will appreciate that the size of the carrier 150 may be readily scaled.

The touch glass layer 106 is temporarily bonded to the carrier 150 prior to patterning. Although any suitable bonding technique may be employed, it has been discovered that application of a curable bonding material between the touch glass 106 and the carrier 150 achieves the objective. By way of example, a bonding material called WaferBond® (which may be obtained from Brewer Science®) may be employed. This type of bonding material is applied to one or both of the touch glass 106 and the carrier 150. A preferred approach is to apply the bonding material to the carrier 150. The temperature of the carrier 150 and bonding material (without the touch glass 106 in place) is then elevated to pre-baked the bonding material and drive off dispensing solvent. The touch glass 106 is then positioned on the carrier 150 and brought to temperature to adhere the materials together. Once bonded to the carrier 150, the touch glass 106 may be patterned using any of the known technologies and techniques, such as the process illustrated in FIGS. 4A-4G. During that process (and any other process that is deemed useful) the carrier 150 provides a stiff support to the relatively thin touch glass layer 106. After patterning is complete, the carrier 150 and the touch glass layer 106 are again brought to temperature, which breaks the bond and the touch glass 106 may be separated from the carrier 150.

Figure 5B:
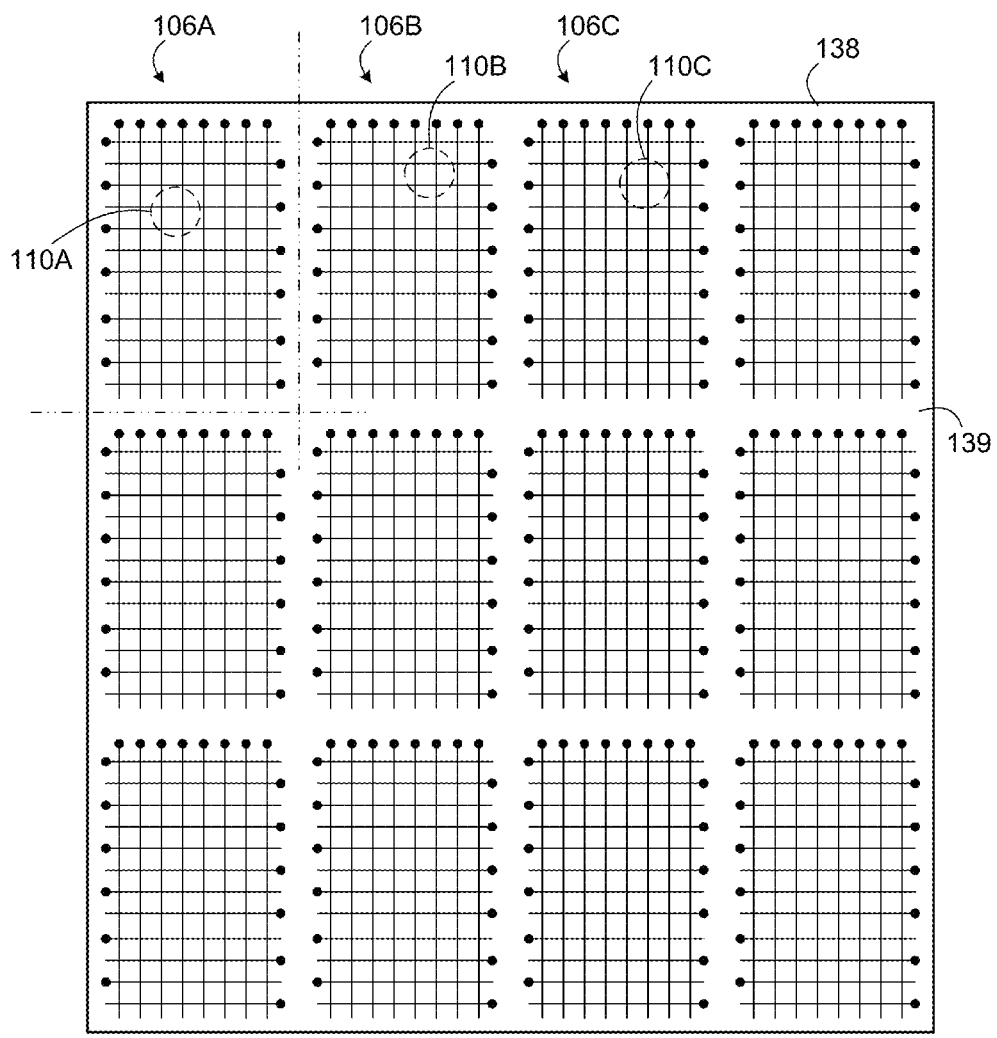
FIG. 5B is a plan view of a sheet of touch glass that may be employed to manufacture a plurality of touch glass components for a plurality of touch sensitive displays in accordance with one or more embodiments herein.

In accordance with other embodiments, it may be desirable to form the touch glass 106 in a batch process such that patterning of a plurality of touch glass layers 106 may be produced simultaneously on a single piece of glass. By way of example, as illustrated in FIG. 5B, a sheet of touch glass 138 is employed to produce a plurality of individual touch glass layers 106A, 106B, 106C, etc. The patterning of the individual touch glass layers 106 includes patterning the sheet of touch glass material 138 with respective sets of electrode traces 112 on one side 139 thereof, thereby forming respective grids 110A, 110B, 110C, etc., each such grid 110 for a separate touch sensitive display 100. Thereafter, the sheet of touch glass material 138 is cut to form the plurality of separate touch glass layers 106, each such layer 106 for one of the separate touch sensitive displays 100. Since the sheet of touch glass material 138 is to be cut after patterning, it is desirable that the glass be somewhat soft, at least in comparison with relatively hard material of the cover glass 104.

Again, as the sheet of touch glass material 138 should be very thin, on the order of 100 um or so, care must be taken in handling the sheet material 138 during patterning. In fact, as the dimensions of the sheet material 138 are much larger than a single piece of touch glass 106, the tendency of the sheet material 138 to bend or warp is even greater. Accordingly, the touch glass material 138 may be temporarily bonded to a carrier, such as the carrier of FIG. 5A (or appropriate size), using substantially the same process as described above prior to patterning.

The patterning of the grids 110 on the sheet of touch glass material 138 may be accomplished in a substantially similar fashion as described with reference to FIGS. 4A-G, except, of course, one would start with the sheet of touch glass material 138 instead of a pre-cut piece of touch glass 106. This batch-type process of forming the touch glass layer 106 is much more cost effective as compared to patterning individual, pre-cut pieces of touch glass material 106.

Figure 6A:
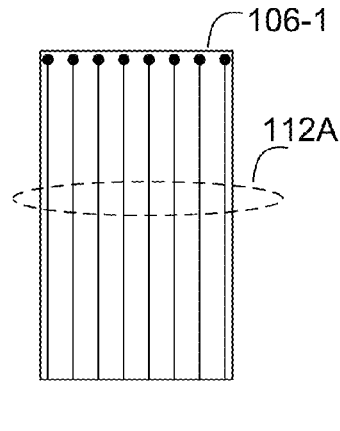
FIGS. 6A, 6B, and 6C are views of some components of a touch sensitive display having an alternative configuration.
Figure 6B:
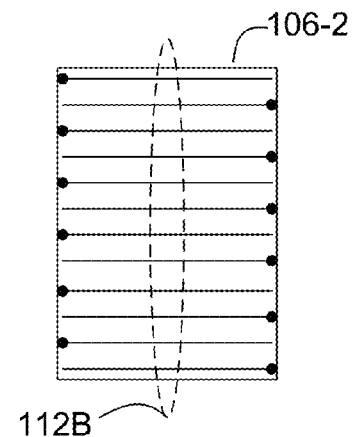
Figure 6C:
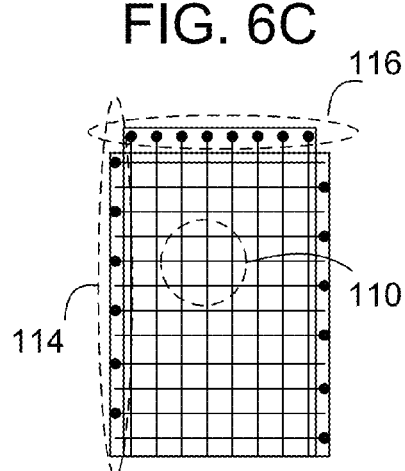
Figure 6D:
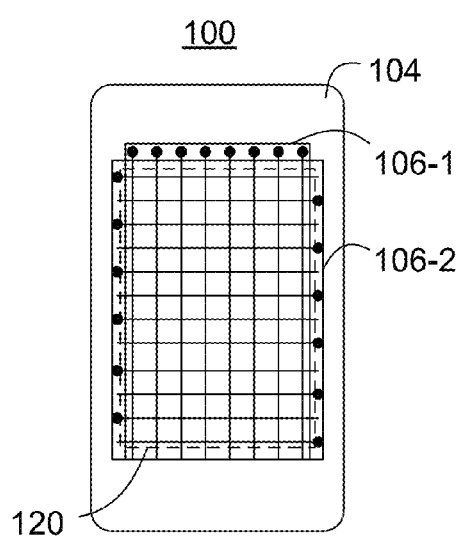
FIG. 6D is a plan view of a touch sensitive display produced using the components of FIGS. 6A, 6B, and 6C in accordance with one or more embodiments herein.

In accordance with one or more further embodiments, a touch sensitive display 100 may be formed using methods and apparatus illustrated in FIGS. 6A-6D. In particular, the touch glass 106 may itself be formed from multiple layers of glass. As illustrated in FIG. 6A, a first piece of touch glass 106-1 may be patterned on one side to form the first plurality of traces 112A (for example, using the process steps discussed with respect to FIGS. 4A-4C). Next, as illustrated in FIG. 6B, a separate piece of touch glass 106-2 may be patterned on one side to form the second plurality of traces 112B (for example, using the process steps discussed with respect to FIGS. 4E-4F, but starting with the bare piece of glass 106-2). Thereafter, as illustrated in FIG. 6C, the pieces of touch glass 106-1 and 106-2 may be stacked one atop the other to produce the grid 110. Such stacking may be accomplished by coupling the opposing surfaces (opposite the patterning) of the respective pieces of touch glass 106-1 and 106-2 to one another, for example by lamination. Alternatively, one non-patterned side of one of the pieces of touch glass 106-1 and 106-2 may be coupled directly or through one or more intermediate layers to a patterned side of the other of the pieces of touch glass 106-1 and 106-2. A still further alternative is to indirectly couple both patterned sides of the pieces of touch glass 106-1 and 106-2 together through one or more intermediate layers (such as dielectric material layer(s)). In any case, advantages are obtained when the peripheral dimensions of the respective pieces of touch glass 106-1 and 106-2 are not precisely the same. When this is done carefully, the respective sets of electrode pads 114, 116 are exposed and available for connection via leads or cables.

Figure 7:
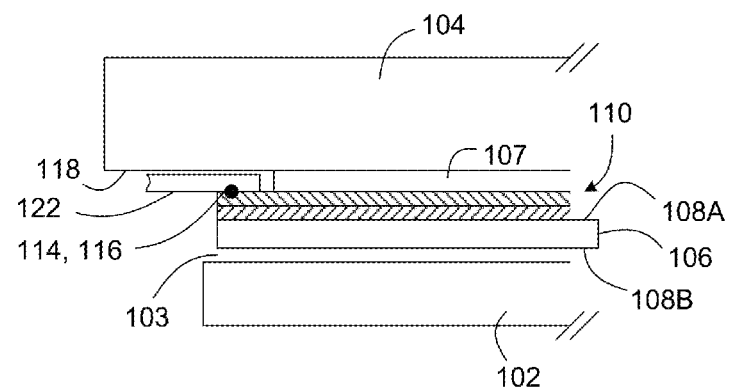
FIG. 7 is a side view of a touch sensitive display having a further alternative configuration.

FIG. 7 illustrates a further alternative embodiment of a touch sensitive display 100A, where a first side 108A of the touch glass 106, carrying the electrode traces 112 (i.e., the grid 110), faces the one side 118 of the cover glass layer 104, and an opposite, second side 108B of the touch glass layer 106 faces the display layer 102. The first side 108A (carrying the grid 110) is laminated to the one side 118 of the cover glass layer 104 via the adhesive layer 107. In this configuration, the respective sets of electrode pads 114, 116 may still be accessible for connection to the one or more conductors 122 (such as leads, cables, flex cable, etc.). This is so because the adhesive layer 107 may provide the requisite clearance for the conductors 122 (e.g., flex cable) to extend between the cover glass layer 104 and the grid 110, thereby reaching the respective sets of electrode pads 114, 116.

Figure 8:
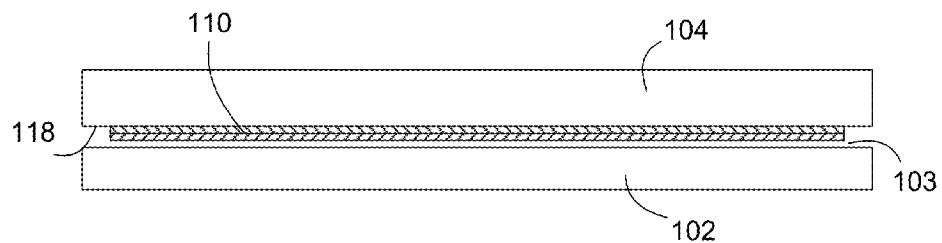
FIG. 8 is a side view of a touch sensitive display having a still further alternative configuration.

FIG. 8 illustrates a further alternative embodiment of a touch sensitive display 100B, where no touch glass is employed. Instead, the electrode traces 112, forming the grid 110, are patterned directly on (or through some intermediate layer) the first side 118 of the cover glass layer 104. This improves the characteristics of the touch sensitive display 100B in that both the thickness and the weight thereof are reduced. One approach to manufacturing such a touch sensitive display 100B, albeit somewhat inefficient, is to pattern the grid 110 onto the side 118 of a pre-cut, pre-hardened piece of cover glass 104 using some of the techniques discussed above for patterning the touch glass.

Efficiencies in manufacturing the touch sensitive display 100B may be obtained when the patterning is carried out in a batch process, where many pieces of cover glass 104 are patterned at the same time or during the same set of processes. As discussed above, such a batch process cannot readily be carried out on a large sheet of cover glass, prior to hardening or cutting the sheet into individual pieces of cover glass 104, because cutting such hardened cover glass 104 is problematic. In accordance with one or more embodiments, however, a batch process is achieved using a plurality of pre-cut pieces of cover glass 104. This process is described below with reference to FIGS. 9A-D.

Figure 9A:
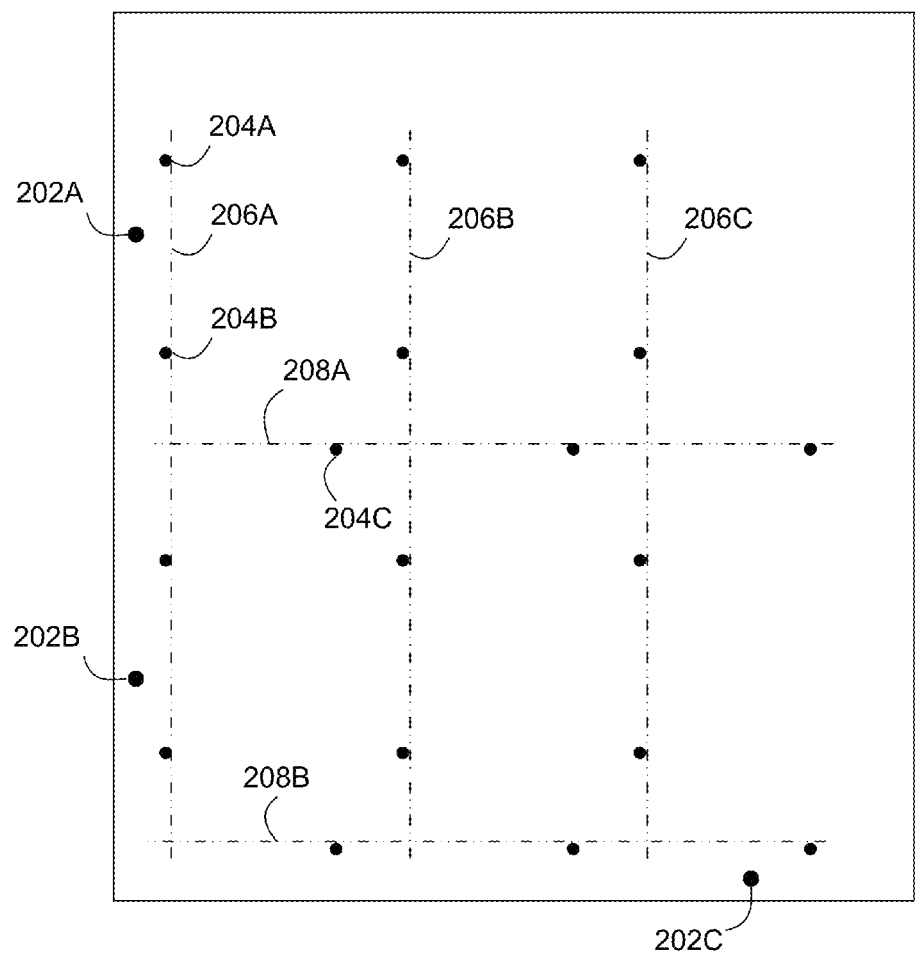
FIG. 9A is a plan view of a fixture useful in manufacturing a plurality of touch sensitive displays in a batch process in accordance with one or more embodiments herein.

FIG. 9A illustrates a fixture 200 for positioning the plurality of pre-cut pieces of cover glass 104 for patterning. The fixture may be formed from any suitable material, such as high grade steel, aluminum, etc., which is relatively flat and of a regular geometry, such as square or rectangular. The fixture 200 includes a number of registration pins 202, 204. The registration pins 202 (such as 202A, 202B, and 202C) are located along two peripheral edges of the fixture 200, such as a pair of registration pins 202A, 202B along one edge and another registration pin 202C along an adjacent edge. The pins 202 may define a pair of perpendicular axes, which as described in more detail below are useful in positioning a carrier 210 (FIG. 9B) on the fixture 200. The carrier 210 is employed to hold the plurality of pre-cut pieces of cover glass 104 during patterning.

The registration pins 204 (such as 204A, 204B, and 204C) are located in a regular grid pattern on the fixture 200. For example, a pair of registration pins 204A, 204B is disposed along an axis 206A, and another registration pin 204C is disposed along a perpendicular axis 208A. As will be discussed in more detail below, the pins 204 are located such that the plurality of pre-cut pieces of cover glass 104 may be coupled to the carrier 210 in a precise, predetermined pattern and orientation. Other registration pins 204 are disposed along further axes 206B, 206C, and 208B. Although the relative size of the fixture 200 of FIG. 9A is shown for illustration and discussion, those skilled in the art will appreciate that the size of the fixture 200 may be readily scaled to any desired size.

Figure 9B:
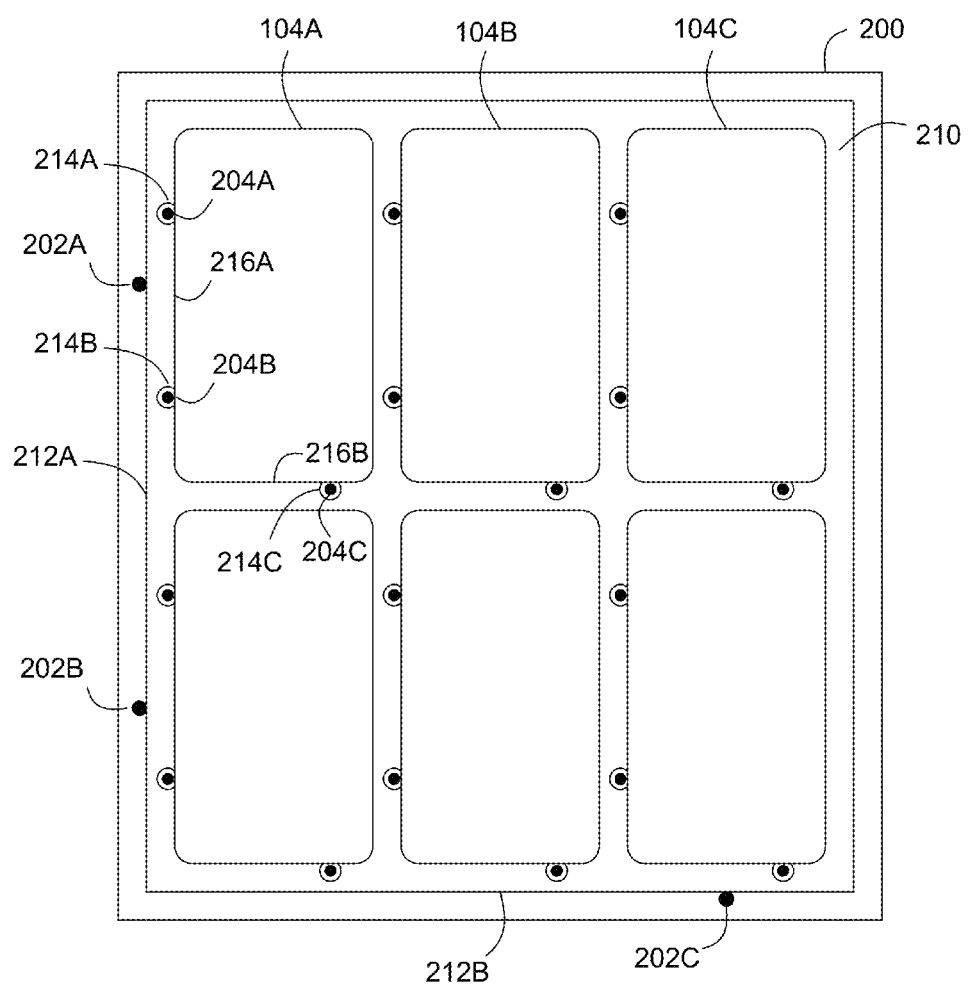
FIG. 9B is a plan view of the fixture of FIG. 9A, a carrier and a plurality of pieces of cover glass in an intermediate stage of manufacture.

With reference to FIG. 9B, the carrier 210 may be formed from any suitable material, although the material should be suitable for bonding with the plurality of pre-cut pieces of cover glass 104. It is believed that advantageous manufacturing yields may be achieved when the material of the carrier 210 is mechanically matched with the plurality of pre-cut pieces of cover glass 104 (e.g., of similar thermal expansion coefficients, and similar chemical composition). Thus, for example, the carrier 210 may be formed from a suitable glass material, such as a piece of an alkali aluminosilicate glass, which has been hardened through ion exchange.

The carrier 210 may be positioned on the fixture 200 by engaging adjacent peripheral edges 212A, 212B thereof against the respective registration pins 202A, 202B, and 202C. This positions the carrier 210 in a precise, predetermined registration with the fixture 200. The carrier 210 includes a plurality of apertures 214, which are in registration with, and oversized as compared to, the registration pins 204. Thus, the pins 204 pass through the apertures 214 as the carrier 210 is placed in registration with the fixture 200. Next, the plurality of pre-cut pieces of cover glass 104 may be coupled to the carrier 210 in a precise, predetermined pattern and orientation defined by the respective registration pins 204. For example, adjacent peripheral edges 216A, 216B of a first piece of cover glass 104A may be placed against the respective pins 204A-C. This places the first piece of cover glass 104A in precise registration with the respective axes 206A, 208A of the fixture 200 (FIG. 9A). The other pieces of cover glass, 104B, 104C, etc. may also be placed on the carrier 210 using the same technique.

In combination with the above-described step of positioning, the pieces of cover glass 104 are temporarily bonded to the carrier 210. Although any suitable bonding technique may be employed, it has been discovered that use of the aforementioned WaferBond® achieves the objective. The bonding material is applied to one or both of the respective pieces of cover glass 104 and the carrier 210. Again, the preferred approach is to apply the bonding material to the carrier 210. The temperature of the carrier 210 and bonding material (without the pieces of cover glass 104 in place) is then elevated to pre-baked the bonding material and drive off dispensing solvent. The pieces of cover glass 104 are then positioned on the carrier 210 using the fixture 200 as described above and brought to temperature to adhere the materials together. When the materials (and thus the bonding material) are again brought to temperature, the bond is broken and the pieces of cover glass 104 may be separated from the carrier 210.

Figure 9C:
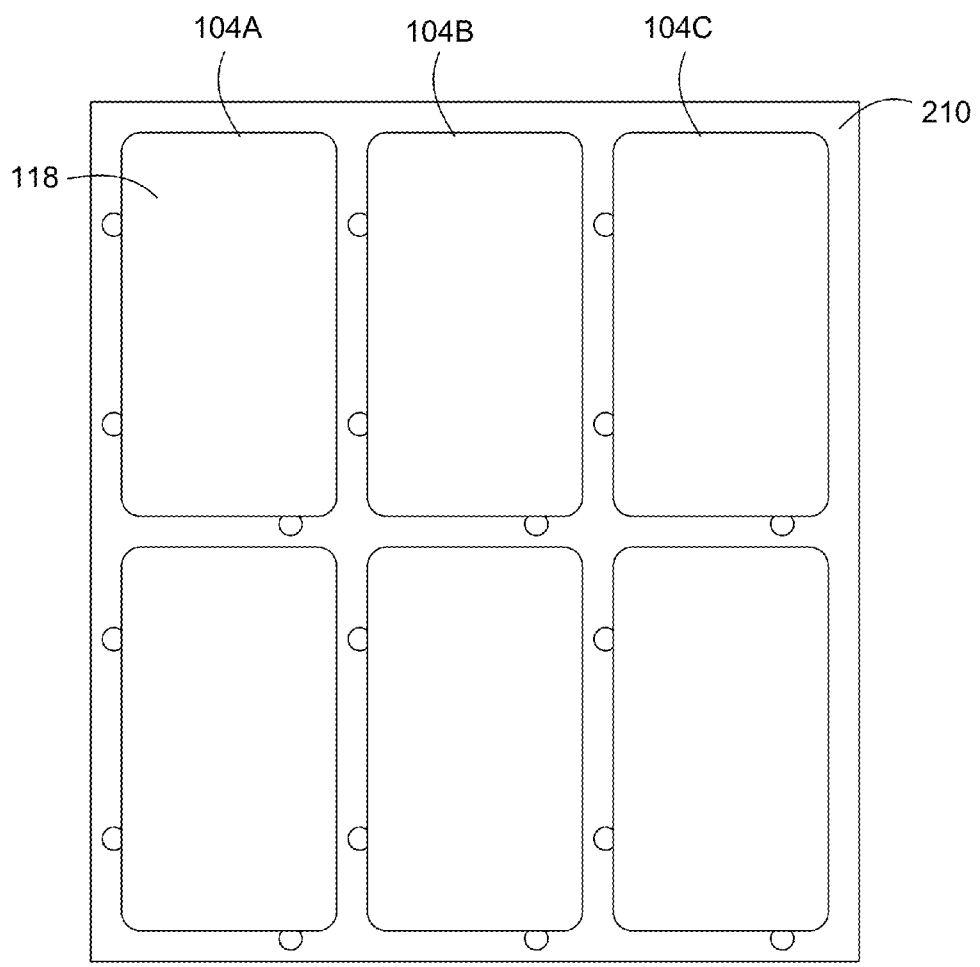
FIGS. 9C and 9D are plan views of the carrier and the plurality of pieces of cover glass of FIG. 9B in further stages of manufacture.

As illustrated in FIG. 9C, after the temporary bond is established, the carrier 210 may be removed from the fixture 200. The pieces of cover glass 104 are all in precise registration with the carrier 210 and with one another. In this configuration, the grids 110 (i.e. the electrode traces 212) may be deposited on the respective first sides 118 of the pieces of cover glass 104 at the same time using a batch process.

Figure 9D:
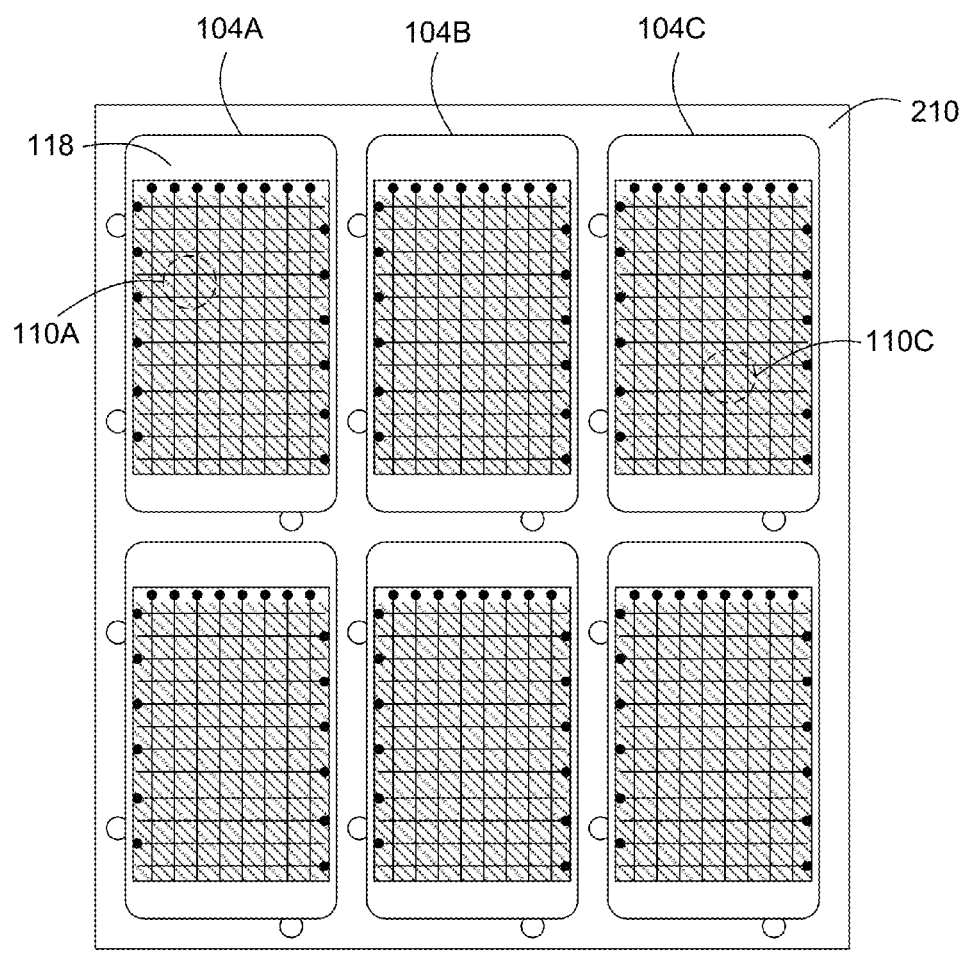

With reference to FIG. 9D, the respective first sides 118 of the pieces of cover glass 104 may be patterned using any of the known technologies and techniques. By way of example, the process illustrated in FIGS. 4A-4G and described above may be extended to achieve this objective. Each of the first sides 118 of the pieces of cover glass 104 may be coated with electrode material 130 (e.g., Indium tin oxide) using and any of the known coating processes. Next, some of the electrode material 130 may be removed (e.g., via photolithography) from each of the pieces of cover glass 104, leaving respective first pluralities of traces 112A extending substantially in a first direction, D1. Next, a dielectric layer 132 (e.g., silicon dioxide) may be applied to all of the first sides 118 of the pieces of cover glass 104, which substantially covers the respective first pluralities of traces 112A. Each of the first sides 118 of the pieces of cover glass 104 may then be coated with a further electrode material 134, covering the dielectric layer 132. Thereafter, some of the electrode material 134 may be removed to leave respective second pluralities of traces 112B extending substantially in a second direction, D2 (transverse to the first direction D1). The respective pluralities of traces 112A and 112B form respective grids 110 on each of the pieces of cover glass 104.

After formation of the grids 110, the temporary bond between the pieces of cover glass 104 and the carrier 210 is released (e.g., using the aforementioned elevated temperature), thereby resulting in a plurality of separate touch sensitive displays 100B.

It is contemplated that being able to avoid the use of apertures 214 through the carrier 210 will lead to a much more advantageous manufacturing process. Thus, in accordance with one or more further embodiments, the foregoing batch process may be achieved using an alternative system and process, which is described below with reference to FIGS. 10A-C.

Figure 10A:
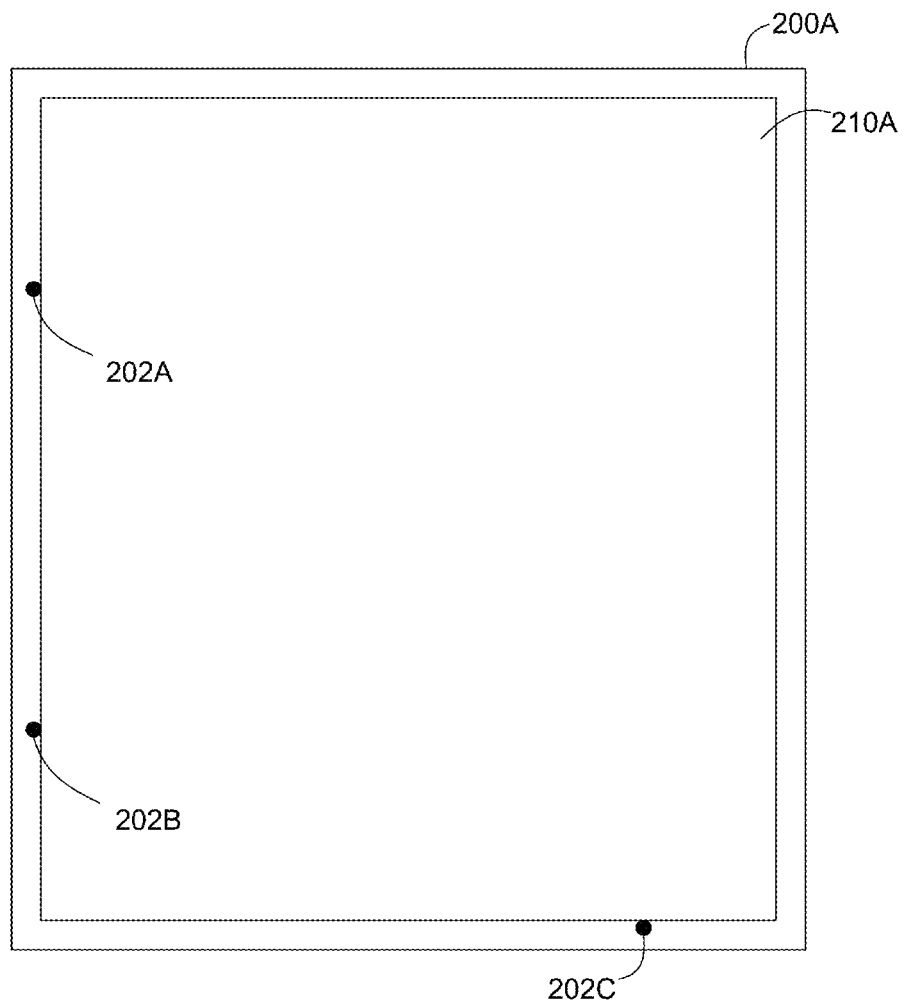
FIG. 10A is a plan view of a fixture having an alternative configuration also useful in manufacturing a plurality of touch sensitive displays in a batch process in accordance with one or more further embodiments herein.

FIG. 10A illustrates a fixture 200A of alternative construction for positioning the plurality of pre-cut pieces of cover glass 104 for patterning. Like the fixture 200, the fixture 200A may be formed from any suitable material, such as high grade steel, aluminum, etc. The fixture 200A includes fewer registration pins than the prior embodiment. Only registration pins 202A, 202B, and 202C are required in this embodiment, which define a pair of perpendicular axes for positioning a carrier 210A of alternative configuration on the fixture 200A. There is no need for registration pins 204 on the fixture 200A.

Figure 10B:
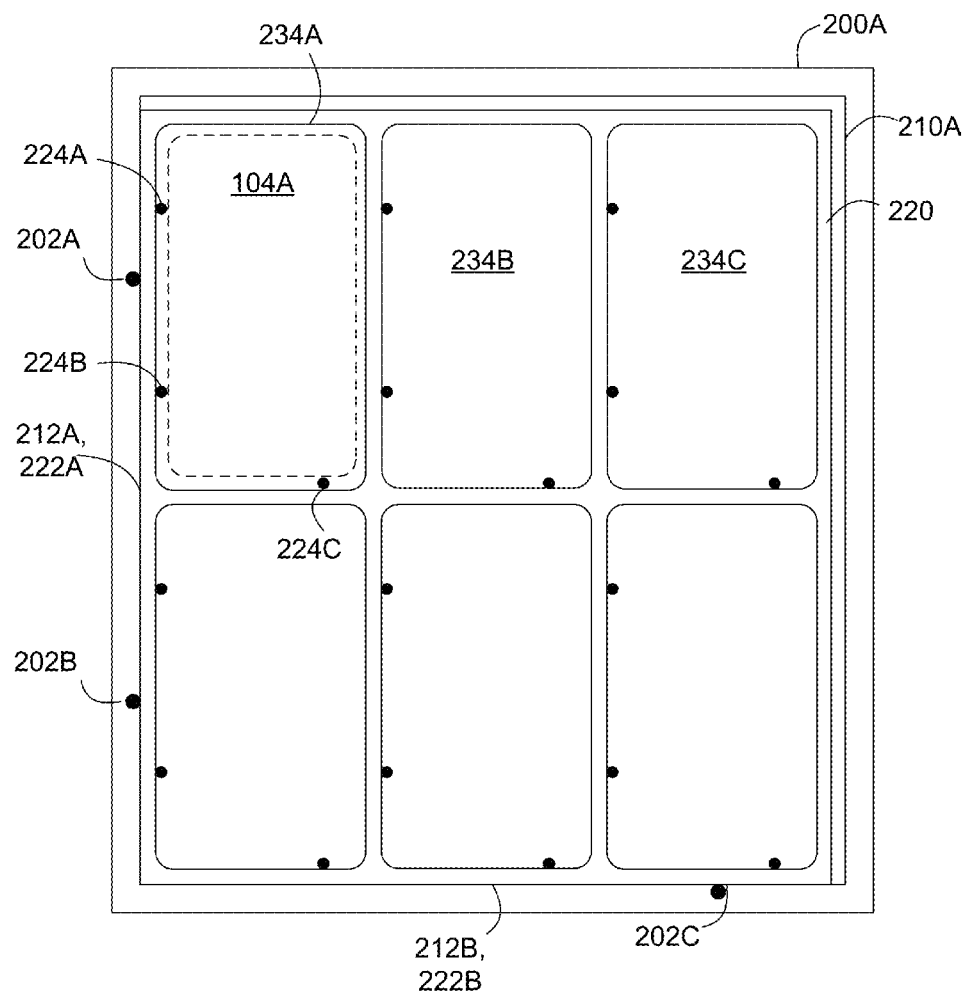
FIG. 10B is a plan view of the fixture of FIG. 10A, a carrier, and a fixture registration frame in an intermediate stage of manufacture.

With reference to FIG. 10B, the system includes a fixture registration frame 220 formed from any suitable material, such as high grade steel, aluminum, etc. The fixture registration frame 220 functions to locate the plurality of pre-cut pieces of cover glass 104 with respect to the carrier 210A in a precise, predetermined pattern and orientation. In particular, the fixture registration frame 220 includes first and second adjacent edges 222A, 222B (which should be perpendicular to one another). The edges 222A, 222B engage the registration pins 202 of the fixture 200A in order to properly register the fixture registration frame 220 to the carrier 210A. The fixture registration frame 220 also includes a plurality of cut-outs 234, such as 234A, 234B, 234C, etc. The cut-outs 234 are oversized with respect to the pre-cut pieces of cover glass 104 (only cover glass 104A being shown for reference). Within the inner periphery of each cut-out 234 is a set of registration bumps 224 (such as 224A, 224B, 224C), which may be integral to the frame 220. Each set of bumps 234 is sized and shaped to properly register the pre-cut pieces of cover glass 104 with respect to the carrier 210A in a precise, predetermined pattern and orientation. Thus, the frame 220 and the registration bumps 224 thereof function in a similar way as the registration pins 204 of the fixture 200 of the previous embodiment. The apertures 214 through the carrier, however, are not required.

Figure 10C:
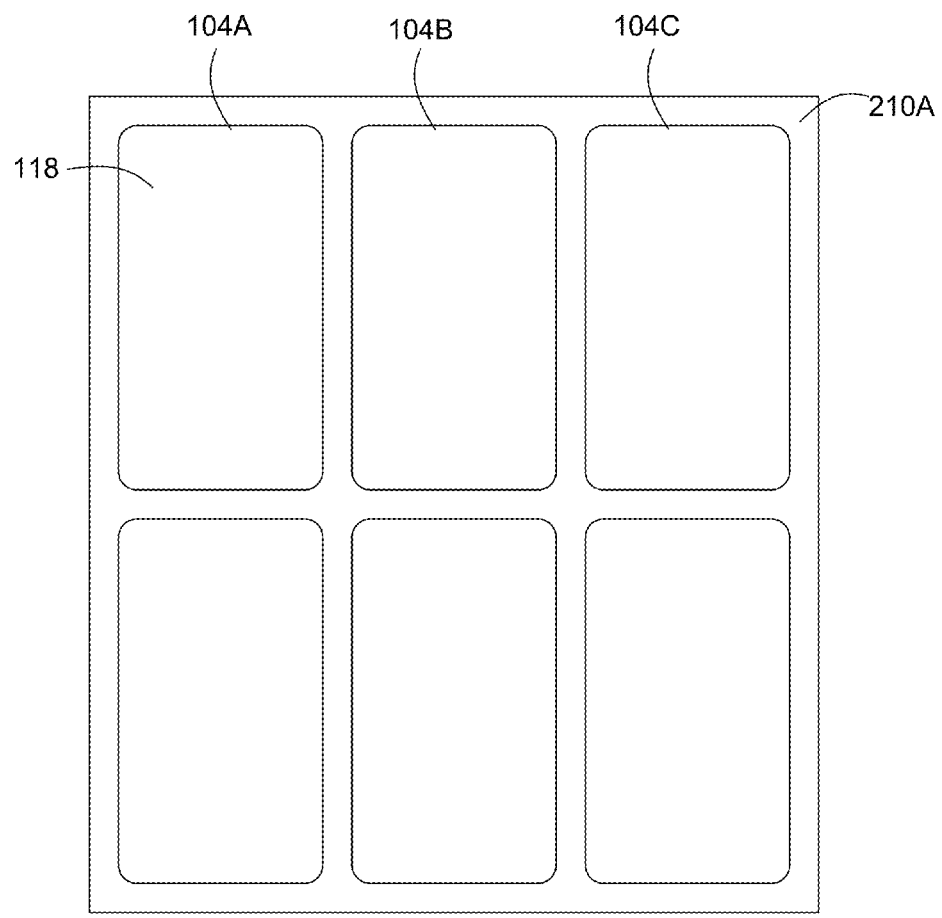
FIG. 10C is a plan view of the carrier and the plurality of pieces of cover glass in a further stage of manufacture.

As illustrated in FIG. 10C, after the temporary bonding process, the carrier 210A may be removed from the fixture 200A. The pieces of cover glass 104 are all in precise registration with the carrier 210A and with one another. In this configuration, the grids 110 (i.e. the electrode traces 212) may be deposited on the respective first sides 118 of the pieces of cover glass 104 at the same time using the patterning batch process described above with respect to FIGS. 4A-4G.

After formation of the grids 110, the temporary bond between the pieces of cover glass 104 and the carrier 210A is released (e.g., using the aforementioned elevated temperature), thereby resulting in a plurality of separate touch sensitive displays 100B (FIG. 8).

It is contemplated that being able to avoid the use of the apertures 214 through the carrier 210 (FIG. 9B), and to avoid the use of the fixture registration frame 220 (FIG. 10B) will lead to further advantageous manufacturing processes. In particular, in some applications it may be advantageous to permit the carrier 210, 210A to be arranged in a vertical orientation during patterning. Although each of the carriers 210, 210A disclosed in FIGS. 9A-9D and FIGS. 10A-10C, respectively, are capable of being orientated vertically during patterning, there is come practical limit as to the maximum temperature at which patterning (or any other process) is permitted while the cover glass 104 is temporarily bonded to the vertically-oriented carrier 210, 210A. Indeed, at some relatively high temperature, the bonding material (such as the WaferBond® material) may be come too viscous to hold the cover glass 104 in place, and the cover glass 104 may move out of registration due to the force of gravity. Thus, in accordance with one or more further embodiments, the foregoing batch process may be achieved using an alternative system and process, which is described below with reference to FIGS. 11A-11B.

FIG. 11A illustrates a fixture 200B of alternative construction for positioning the plurality of pre-cut pieces of cover glass 104 for patterning. Unlike the fixtures 200, 200A, the fixture 200B preferably does not include a metal base on which the carrier 210, 201A is registered. Instead, the fixture 200B includes a carrier 210B, which includes a set of registration bumps or pins 224 for each piece of cover glass 104. The registration pins 224 are fixed to the carrier 210B. For example, the carrier 210B includes a first set of registration pins 224A, 224B, 224C for registering a first piece of cover glass 104A to the carrier 210B. Although not labeled, further sets of registration pins (three pins being shown in each set for example only) are precisely positioned on the carrier 210B to properly register the respective pre-cut pieces of cover glass 104 with respect to the carrier 210B in a precise, predetermined pattern and orientation. The pieces of cover glass 104 are thus in precise registration with the carrier 210B and with one another.

As illustrated in FIG. 11B, the pieces of cover glass 104A-104F are temporary bonded (e.g., using WaferBond® material) to the carrier 210B in a manner similar to previous embodiments. Thus, the carrier 210B and the registration pins 224 function in a similar manner as the embodiments of FIGS. 9 and 10, except that the pins 224 are fixed to the carrier 210B as opposed to only being temporarily employed during fixturing/bonding.

In this configuration, the grids 110 (i.e. the electrode traces 212) may be deposited on the respective first sides 118 of the pieces of cover glass 104 at the same time using the patterning batch process described above with respect to FIGS. 4A-4G. Notably, even if the carrier 210B is in a vertical orientation (or at least non-horizontal orientation) during patterning, and even if the temperature elevates somewhat above a threshold at which the bonding material begins to flow, the pins 224 ensure that the cover glass 104 remains in proper registration.

After formation of the grids 110, the temporary bond between the pieces of cover glass 104 and the carrier 210B is released (e.g., using the aforementioned elevated temperature), thereby resulting in a plurality of separate touch sensitive displays 100B (FIG. 8).

Figure 12A:
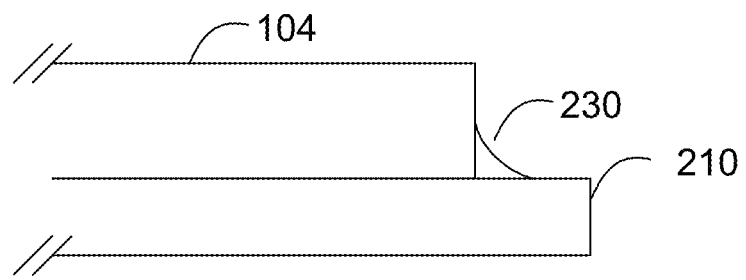
FIG. 12A is a side view of the carrier and piece of cover glass showing some bonding details.

In one or more of the embodiments discussed above, the pieces of cover glass 104 may be temporarily bonded to the carrier 210. Again, the WaferBond® material may be employed. It is noted that, irrespective of which batch system and process is employed (FIGS. 9A-9D, FIGS. 10A-10C, and or FIGS. 11A-11B), the bonding material may be applied in any number of ways. In one embodiment, a bit of the bonding material may be disposed on the carrier 210, 210A, 210B roughly in the central area of each of the pieces of cover glass 104. Since wicking of patterning substances between the pieces of cover glass 104 and the carrier 210, 210A, 210B is of concern, a fillet 230 (FIG. 12A) of bonding material may be applied to the periphery of the pieces of cover glass 104. By way of example, the fillet 230 may be manually applied via syringe after the pieces of cover glass 104 are placed onto the carrier 210, 210A, 210B but before elevating the temperature.

Figure 12B:
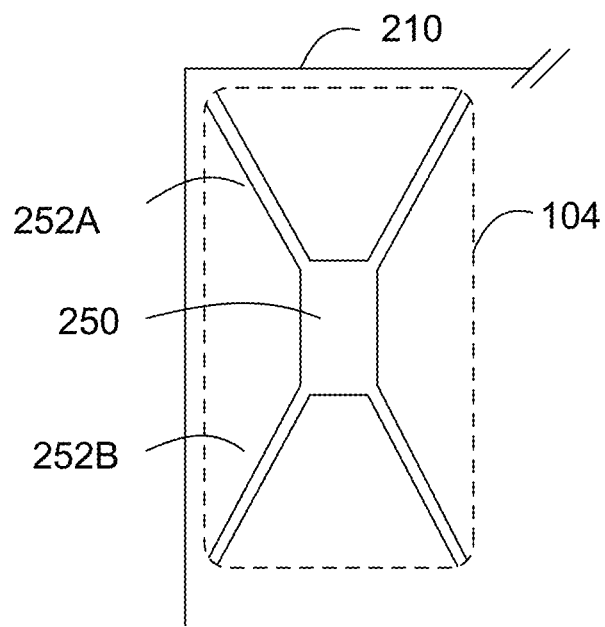
FIG. 12B is a plan view of the carrier showing some further bonding process details.

Alternatively, a particular pattern of bonding material may be applied to the carrier 210, 210A, 210B (or to each piece of cover glass 104) in order to achieve a good seal at the periphery of each piece of cover glass 104 (without the need for separately applying a fillet 230). Such a pattern of bonding material is illustrated in FIG. 12B. The pattern includes a central portion 250 of generally the same shape as the cover glass 104, but significantly smaller. By way of example, the central portion 250 may measure about ⅓ the length and width of the cover glass 104. The pattern may also include radially extending portions 252, such as 252A, 252B, etc., which originate at respective corners of the central portion 250 and extend outward. Under temperature, the bonding material wicks outward to the peripheral edges of the cover glass 104, thereby sealing same.

In a still further embodiment, the fixture systems of FIGS. 9A-9D, FIGS. 10A-10C, and/or FIGS. 11A-11B may be employed to assist in temporarily bonding the touch glass 106 to the carrier 150 of FIG. 5A, or to assist in temporarily bonding the touch glass material sheet 138 to the carrier 150. Still further, such fixture systems may be employed in order to temporarily bond a plurality of the individual pieces of touch glass 106 to a carrier. Essentially, the pieces of touch glass 106 (not the cover glass 104) would be temporarily bonded to the carrier 150, 210, 210A and thereafter patterned using the patterning process described above with respect to FIGS. 4A-4G. Once patterned, the pieces of touch glass 106 may be laminated to the respective pieces of cover glass 104 as previously discussed with respect to FIG. 2 and/or FIG. 7.

Reference is now made to FIG. 13, which illustrates a further alternative embodiment of a touch sensitive display 100C. In this embodiment, the electrodes 112 of the grid 110 are not formed from Indium tin oxide, but rather from a metal material, such as gold, silver, copper, aluminum, lead, alloys of same, etc. While these (or other such metals) do not exhibit the characteristic of transparency (as does Indium tin oxide), indeed such metals are opaque, they are far less expensive and far more conductive, and thus desirable for manufacturing a commercially viable product. The opaque characteristic of a metal grid 110 has made same undesirable for touch sensitive displays because a user can see the grid 110. It has been discovered that this problem may be mitigated by interposing a dark material, such as material of black resin photoresist (from firms such as Tokyo Ohka Kogyo Co., Ltd.), between the grid 110 and the user.

Thus, as illustrated in FIG. 13, the grid 110 may be formed from a first plurality of electrode traces 252 extending in a first direction (only trace 252A being viewable from the perspective of the drawing) and a second plurality of electrode traces 262A, 262B, 262C, etc. extending in a second direction. A respective piece (or trace) of dark material 254 (only piece 254A being viewable) is interposed between each of the first plurality of electrode traces 252 and the cover glass 104. Similarly, a respective piece (or trace) of dark material 264 (e.g., 264A, 264B, 264C, etc.) is interposed between each of the second plurality of electrode traces 262 and the cover glass 104. It may be desirable to make the respective widths of the traces 252, 254, 262, 264 as thin as possible (without sacrificing conductivity), e.g., about 5 um or less. Thus, from the user's perspective, the visibility of the grid 110 is somewhat obscured or at least significantly lessened as compared with the visibility of naked metal.

Any number of processes may be employed to manufacture the touch sensitive display 100C. For purposes of discussion, one such process will be described below for patterning a grid 110 directly onto the cover glass 104 of a single such display 100C, it being understood that such process may be extended to other embodiments and/or batch processes herein by combining the disclosed techniques with those discussed above.

Figure 14D:
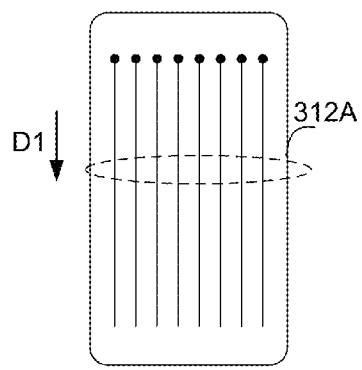

With reference to FIGS. 14A-B, the patterning of the grid 110 onto the cover glass 104 may include coating the one side 118 of the cover glass 104 with a first layer of substantially dark material 320 (e.g., black matrix, or black resin photoresist) using and any of the known coating processes. With reference to FIG. 14C, a first layer of metal electrode material 330 may be applied to the one side 118 of the cover glass 104, thereby covering the first layer of substantially dark material 320. As shown in FIG. 14D, some of the electrode material 330 and the substantially dark material 320 may be removed (e.g., via photolithography) from the cover glass 104, leaving a first plurality of traces 312A extending substantially in a first direction, D1. Each trace 312A includes a trace of the substantially dark material 254 interposed between a trace of the metal electrode 252 and the one side 118 of the cover glass 104.

Figure 14E:
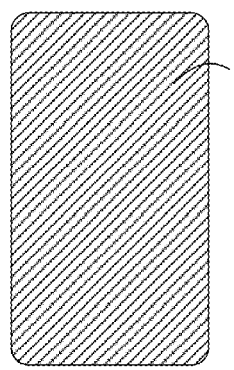
Figure 14F:
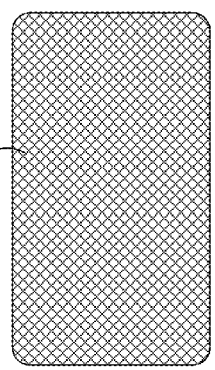
Figure 14G:
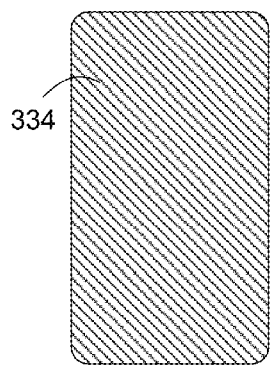
Figure 14H:
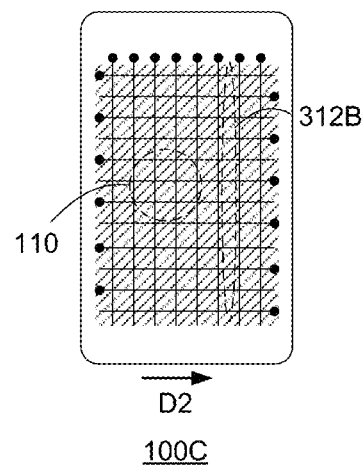

With reference to FIG. 14E, a dielectric layer 332 (e.g., silicon dioxide) may be applied to the first side 118 of the cover glass 104, which substantially covers the first plurality of traces 312A. Next, as shown in FIG. 14F, a second layer of substantially dark material 322 is disposed on the first side 118 of the cover glass 104, which substantially covers the dielectric layer 332. With reference to FIG. 14G, the first side 118 of the cover glass 104 may then be coated with a further metal electrode material 334, covering the second layer of substantially dark material 322. As shown in FIG. 14H, some of the electrode material 334 and some of the second layer of substantially dark material 322 may be removed to leave a second plurality of traces 312B extending substantially in a second direction, D2 (transverse to the first direction D1). Each trace 312B includes a trace of the substantially dark material 264 interposed between a trace of the metal electrode 262 and the one side 118 of the cover glass 104. The respective plurality of traces 312A and 312B form the grid 110 on the cover glass 104.

Some of the embodiments discussed thus far have been directed to the use of a temporary bond between a relatively thin touch glass material and a stiff carrier or between pieces of stiff cover glass and a carrier to assist in batch processing—and ultimate formation of a touch sensitive display. It is noted that the temporary bonding and processing techniques described herein may readily be extended to other applications.

For example, the temporary bonding to a carrier technique may be used in any application in which a relatively thin piece of glass (e.g., prone to bending, etc.) needs to be processed. If the thin piece of glass is relatively large, then a roller (optionally a padded roller) may be used during elevated temperature to achieve an even and uniform temporary bond between the thin glass and the carrier. Another approach includes bending the thin glass and rolling same from one end to another (or from the middle outward) onto the carrier (and bonding material) while at temperature.

An application of the above process may include the formation of displays, such as liquid crystal displays. The formation of LCDs includes the need to assemble components using thin glass that may or may not be hardened through ion exchange. Indeed, some display glass cannot be ion exchanged due to the lack of alkali in the glass. Conventional approaches to manufacturing LCDs (such as for mobile devices), include starting with a relatively thick piece of glass for the color filter (on the order of about 0.5 mm thick). This thick glass is used to avoid bending, warping breaking, etc., during manufacture of the LCD. Once the LCD is assembled, a thinning step is carried out to reduce the thickness of the color filter glass down to about 0.2 mm using acid to back etch. This process is not only environmentally unfriendly, but the step also drives up the manufacturing cost due to yield loss. An attractive alternative would be to start with a relatively thin piece of color filter glass, on the order of about 0.2 mm thick, and temporarily bond such glass to a carrier to make a color filter that is the target thickness and avoid the subsequent back etch thinning step.

Although the embodiments herein have been described with reference to particular aspects and features, it is to be understood that these embodiments are merely illustrative of desired principles and applications. It is therefore to be understood that numerous modifications may be made to the illustrative embodiments and that other arrangements may be devised without departing from the spirit and scope of the appended claims.

The invention claimed is:

1. A touch sensitive display, comprising:
   a display layer;
   a cover glass layer formed from ion exchanged glass; and
   a touch glass layer, a first side of which includes a grid of electrode traces sensitive to distortions of a local electrostatic field caused by a touching event, and one or more electrode pads coupled to terminal ends of one of more of the electrode traces, wherein:
   the touch glass layer is positioned between the display layer and the cover glass layer,
   the first side of the touch glass, carrying the electrode traces, faces and is laminated to one side of the cover glass layer, and an opposite, second side of the touch glass layer faces the display layer,
   the one side of the cover glass adjacent to the one or more electrode pads includes one or more cavities, sized and shaped to receive conductors for connection to the electrode pads.

2. The touch sensitive display of claim 1, further comprising:
   a layer of substantially dark material interposed between one or more of the electrode traces and the cover glass layer,
   wherein the electrode traces are formed from metal.

3. The touch sensitive display of claim 2, wherein one or more of the electrode traces have a width of about 5 um or less.

4. A touch sensitive display, comprising:
a display layer; and
a cover glass layer formed from ion exchanged glass, a first side of which includes a grid of metal electrode traces sensitive to distortions of a local electrostatic field caused by a touching event, and a second side of which is exposed such that a user may touch the second side to make touch inputs to the touch sensitive display, wherein:
the grid is positioned between the display layer and the cover glass layer and the metal electrode traces are patterned onto the first side of the cover glass,
at least some of the metal electrode traces includes a respective layer of substantially dark material interposed between such metal electrode traces and the cover glass layer.

* * * * *